(12) United States Patent
White

(10) Patent No.: US 8,443,065 B1
(45) Date of Patent: May 14, 2013

(54) SYSTEM AND METHOD FOR LOCATING, IDENTIFYING AND PROVISIONING NEWLY DEPLOYED NETWORK DEVICES

(75) Inventor: Troy W. White, Toney, AL (US)

(73) Assignee: Adtran, Inc., Huntville, AL (US)

( * ) Notice: Subject to any disclaimer, the term of this patent is extended or adjusted under 35 U.S.C. 154(b) by 263 days.

(21) Appl. No.: 12/941,123

(22) Filed: Nov. 8, 2010

(51) Int. Cl.
*G06F 15/173* (2006.01)

(52) U.S. Cl.
USPC .......................... 709/222; 370/254; 709/227

(58) Field of Classification Search .................. None
See application file for complete search history.

(56) References Cited

U.S. PATENT DOCUMENTS

| | | | |
|---|---|---|---|
| 7,580,403 B2 | 8/2009 | Frattura | 370/352 |
| 2005/0099954 A1* | 5/2005 | Mohan et al. | 370/241.1 |
| 2005/0232164 A1 | 10/2005 | Anzarouth et al. | 370/255 |
| 2006/0274774 A1 | 12/2006 | Srinivasan et al. | 370/420 |
| 2008/0240104 A1 | 10/2008 | Villait et al. | 370/392 |
| 2008/0270588 A1 | 10/2008 | Sultan et al. | 709/223 |
| 2009/0116404 A1* | 5/2009 | Mahop et al. | 370/254 |
| 2009/0176474 A1* | 7/2009 | Bajko | 455/404.1 |
| 2009/0180389 A1 | 7/2009 | Mack-Crane et al. | 370/242 |
| 2010/0278076 A1* | 11/2010 | Reddy et al. | 370/254 |
| 2011/0125392 A1* | 5/2011 | Hao | 701/118 |
| 2012/0102190 A1* | 4/2012 | Durham et al. | 709/224 |
| 2012/0184291 A1* | 7/2012 | Tietsch et al. | 455/456.1 |
| 2012/0195232 A1* | 8/2012 | Mahkonen et al. | 370/255 |

* cited by examiner

*Primary Examiner* — Ario Etienne
*Assistant Examiner* — Clayton R Williams
(74) *Attorney, Agent, or Firm* — Fish & Richardson P.C.

(57) ABSTRACT

At least one existing neighboring network device is connected to a newly deployed network device in a communications network. A network manager is connected remotely. The newly deployed network device is configured to determine its physical network connectivity by propagating a discovery protocol frame to the at least one existing neighboring network device. The frame in an example includes a field having a query that solicits from the existing neighboring network device the physical network connectivity data of the newly deployed device. This device is also configured to receive in response to the query, its physical network connectivity data and network data address of the network manager in a response, transmit its physical network connectivity data to the remote network manager, which in turn is configured to transmit provisioning data to the newly deployed network device based on the received physical network connectivity data.

25 Claims, 5 Drawing Sheets

MAC ADDRESS TLV

| TLV TYPE =127 | TLV INFORMATION STRING LENGTH | OUI 0x00 0xA0 0xC8 | TLV SUBTYPE 0x05 | MAC ADDRESS | ACTION |

SYSTEM AND METHOD FOR LOCATING, IDENTIFYING AND PROVISIONING NEWLY DEPLOYED NETWORK DEVICES

FIELD OF THE INVENTION

This invention relates to communications systems, and more particularly, this invention relates to locating, identifying and provisioning newly deployed network devices.

BACKGROUND OF THE INVENTION

Service providers such as telecommunications companies will deploy new network equipment as network devices. The service providers generally will manually provision several items such as an IP address, default gateway, management VLAN, device name, and device location before the new network equipment can be seen or managed by a remote network manager, for example, a Network Management System (NMS), also referred to often as a Network Management Administrator (NMA) by some skilled in the art. An example of a NMS is a management system as manufactured and supplied by ADTRAN, INC. of Huntsville, Ala. This process is time consuming and error prone and requires operators to spend large amounts of time at remote sites. Also, if any information used for provisioning is not set correctly, it may require additional trips such as "truck rolls" to remote sites to correct it.

A newly deployed network device, also referred to as a network element, can announce itself to the network manager using a different number of techniques once it is connected into the communications network. If no information or data has been provisioned into the newly deployed network device, however, the network manager acting as a network administrator has no way to know the location of the newly deployed device, and thus, the network manager does not know the identity of the newly deployed device using existing mechanisms.

SUMMARY OF THE INVENTION

A plurality of network switches as network elements are interconnected together and configured to form a communications network. At least one existing neighboring network device is connected to a newly deployed network device on the communications network. A network manager is connected remotely in the network from the newly deployed network device and an existing neighboring network device. The newly deployed network device is configured to determine its physical network connectivity within the communications network by propagating a discovery protocol frame to the at least one existing neighboring network device. This discovery protocol frame in one example is a field having a query that solicits from the existing neighboring network device the physical network connectivity data of the newly deployed device. This device is also configured to receive in response to the query, its physical network connectivity data and network data address of the network manager in a response, transmit its physical network connectivity data to the remote network manager, which in turn is configured to transmit provisioning data to the newly deployed network device based on the received physical network connectivity data.

In one example, the physical network connectivity data comprises at least one network data address for the network manager. The newly deployed network device is configured to receive a plurality of potential network data addresses for the network manager and attempt connection to the network manager using at least one of the plurality of potential network data addresses. In the event the newly deployed network device does not receive a network data address for the network manager, the newly deployed device is configured to announce itself by transmitting layer 2 broadcast messages throughout the communications network.

In another example, the discovery protocol frame comprises a Link Layer Discovery Protocol (LLDP) frame and in yet another example, it comprises a link layer Ethernet OAM message. The physical network connectivity data in another example comprises at least one of the physical and logical location connection data for the newly deployed network device and data uniquely identifying the existing connected device. At least one of the physical and logical location connection data comprises data regarding the physical slot and port of the existing neighboring device. In another example, the at least one of the physical and logical location connection data comprises data regarding the ID of a logical Ethernet in the First Mile (EFM) bonding group.

In another example, the physical network connectivity data comprises device data that identifies the existing network device. This device data could be at least one of an IP address and node number of the existing neighboring network device to the newly deployed network device. A Management Information Base (MIB) is configured to be accessed via the Simple Network Management Protocol (SNMP) to determine the physical network connectivity data.

It is also possible that the at least one existing neighboring network device is configured to determine the physical network connectivity of the newly deployed network device and propagate a discovery protocol frame that comprises a field having a query that solicits the physical network connectivity of the newly deployed network device within the communications network. The network connectivity data is transmitted to the network manager, which then transmits provisioning data to the newly deployed network device based on the received physical network connectivity data. Thus, while the newly deployed device could send a query over LLDP as previously described, this embodiment may have the existing device sending the required location and addressing information within LLDP TLV's all the time without requiring the new device to send the query.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1:
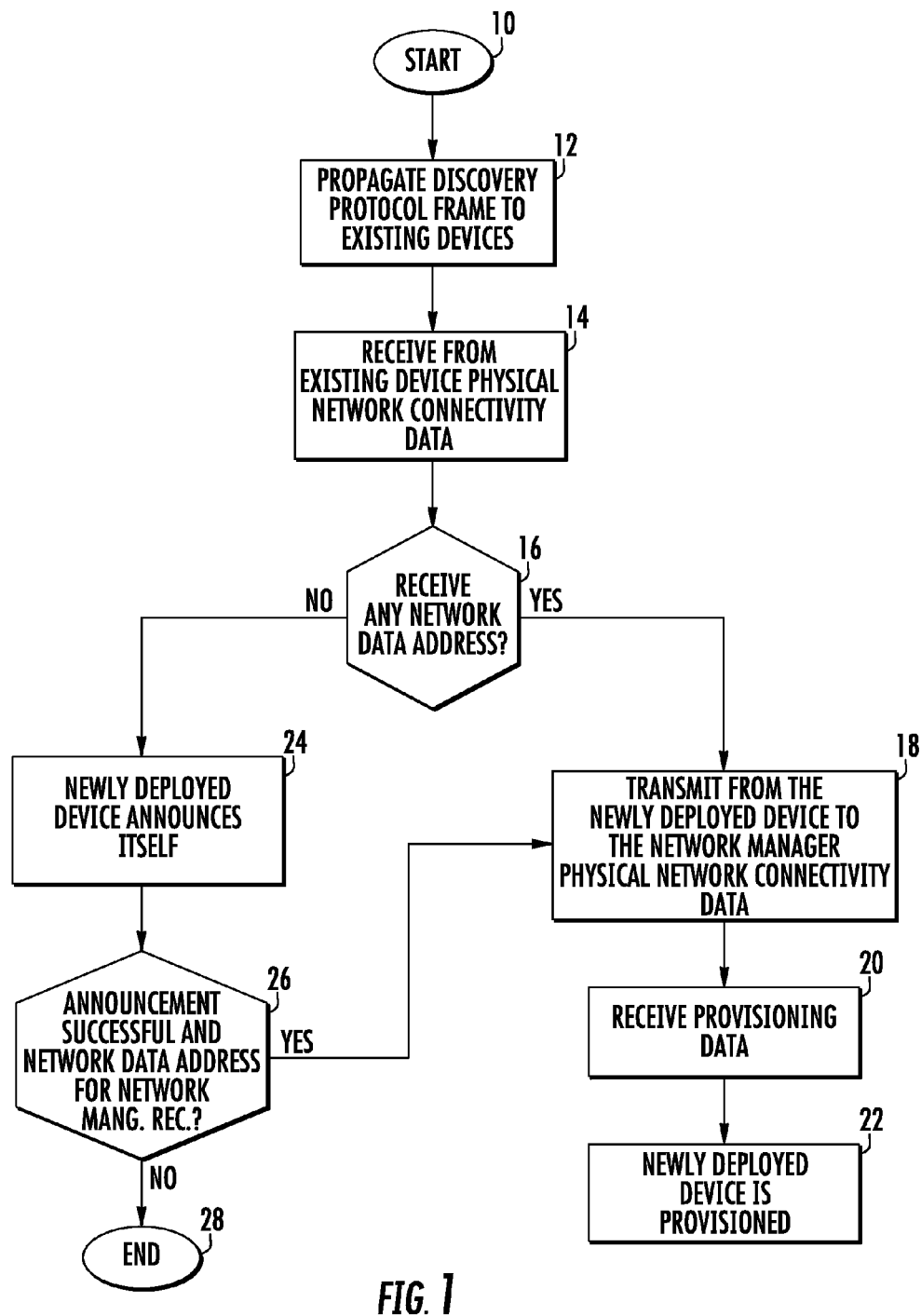
FIG. 1 is a high-level flowchart of an example method that can be used in accordance with a non-limiting example for locating, identifying and provisioning a network device within a communications network.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

In accordance with a non-limiting example, a technical solution to this problem addressed above is to have a newly deployed network device learn its physical network connectivity as location information from at least one existing neighboring network device it is connected to using a discovery protocol such as a one-way discovery protocol.

The newly deployed network device could receive this location information using a discovery protocol via numerous Layer 2 means, including but not limited to, LLDP and Link Layer Ethernet OAM messages. A minimum set of information typically to be relayed between the new device and its existing link peer includes: 1) the physical and/or logical location of the new device connection point, which may include information such as the physical slot and port and of the device to which the new device is connected to or the ID of a logical EFM bonding group, etc.; and 2) information uniquely identifying the existing device, which may include the device's IP address, node number, or other data regarding unique characteristics.

Data also is sent to the new device regarding the Layer 2 address on the network manager to allow the new device to contact the network manager. In one example, the new device may be provided a plurality of addresses to contact in the event some addresses are unreachable or potentially may be provided no address. In the event no address is given, the newly deployed network device may elect to use Layer 2 broadcast messages to announce itself.

Once the newly deployed network device has received its connectivity data, the newly deployed network device may announce itself to the network manager and include this connectivity data, which will allow the network manager to determine the location of the newly deployed network device. With the location/identity of the new device known to the network manager, automated systems and/or the network manager as part of a Network Management System (NMS) could have its operators send the required provisioning information to the newly deployed network device using Layer 2 methods. Once the newly deployed network device has received this provisioning information and acted on this information, it may function and interact with the network manager and other network elements using traditional methods.

In one non-limiting example, a LLDP organizationally-specific TLV can be changed such that the LLDP packet is modified to obtain the minimum set of information to be relayed as described above. It should be understood that link layer Ethernet OAM messages can be similarly modified. LLDP and Ethernet OAM include and support vendor specific extensions. It is possible to use a proprietary protocol to drive underneath the Ethernet layer, which could be made a public protocol and not specifically relegated to manufacturer devices.

It is possible for the newly deployed network device to announce itself to the network manager using different techniques, for example, by sending a "Hello" packet with the Layer 2 MAC address and other information. The network manager will receive the Hello packet and process the information. For example, the data could indicate that the newly deployed device is of "type X" and connected to port W on the other known device, which could be newly deployed. Because the network manager knows the architecture of the network and understands when the existing neighboring network device was plugged in, it will know its IP address. It is also possible that the network manager could construct a Layer 2 packet as a proprietary format riding behind the provider Ethernet to transmit information back to the newly deployed network device. It is also possible for the network manager to transmit back a Layer 3 address to that device, which typically in the past has been statically assigned or use DHCP. This Layer 3 address could be assigned based on the provisioning that occurred in the network manager at some point previous to when the device was connected. Once the network manager has transmitted the Layer 3 address back to the device, the device would turn on its IP stack and would now have a Layer 3 presence in the network and the device could be managed by traditional techniques.

It is also possible that the at least one existing neighboring network device is configured to determine the physical network connectivity of the newly deployed network device and propagate a discovery protocol frame that comprises a field having a query that solicits the physical network connectivity of the newly deployed network device within the communications network. The network connectivity data is transmitted to the network manager, which then transmits provisioning data to the newly deployed network device based on the received physical network connectivity data. Thus, while the newly deployed device could send a query over LLDP as previously described, this embodiment may have the existing device sending the required location and addressing information within LLDP TLV's all the time without requiring the new device to send the query.

FIG. 1 is a high-level flowchart illustrating a method in accordance with a non-limiting example. The process starts (block 10) and a discovery protocol frame is propagated to at least one existing neighboring device (block 12). This discovery protocol frame typically includes a field having a query that solicits from the existing neighboring network device the physical network connectivity data of the newly deployed device within the communications network. In response to this query, the newly deployed network device receives from the existing device the physical connectivity data of the newly deployed network device (block 14). The discovery protocol frame in one example comprises a Link Layer Discovery Protocol (LLDP) frame or a link layer Ethernet OAM message for discovering the physical network connectivity of the newly deployed network device. Other examples can be included. The physical network connectivity data in one example is at least one of physical and logical location connection data of the newly deployed network device and data uniquely identifying the existing connective device. This data could be a physical slot and port of the existing neighboring network device. At least one of the physical and logical location connection data comprises data regarding the ID of a logical EFM bonding group. The physical network connectivity data in another example comprises device data that identifies the existing network device and comprises the IP address or node number of existing neighboring network device to the newly deployed network device. It is possible to access at a network switch a Management Information Base (MIB) via the Simple Network Management Protocol (SNMP) to determine the physical network connectivity data.

A determination is also made whether the network manager data address is received (block 16). If yes, then the newly deployed network device transmits to the network manager the physical network connectivity data (block 18). Provisioning data is received from the network manager (block 20) and the newly deployed device is provisioned (block 22). It should be understood that it is possible that a plurality of potential network addresses for the network manager are received within the newly deployed network device and the newly deployed network device attempts connection to the network manager using at least one of the plurality of potential data addresses.

If a determination is made that the newly deployed network device does not receive a network data address for the network manager, the newly deployed network device announces itself by transmitting Layer 2 broadcast messages throughout the communications network (block 24). A determination is made if the broadcast messages were successful and a network data address received for the network manager (block 26). If yes, then the received network address for the network manager is used by the newly deployed network device to transmit the physical network connectivity data (block 18). If no, then the process ends in this one example (block 28), but in other examples, the process could loop back and start again.

Figure 2:
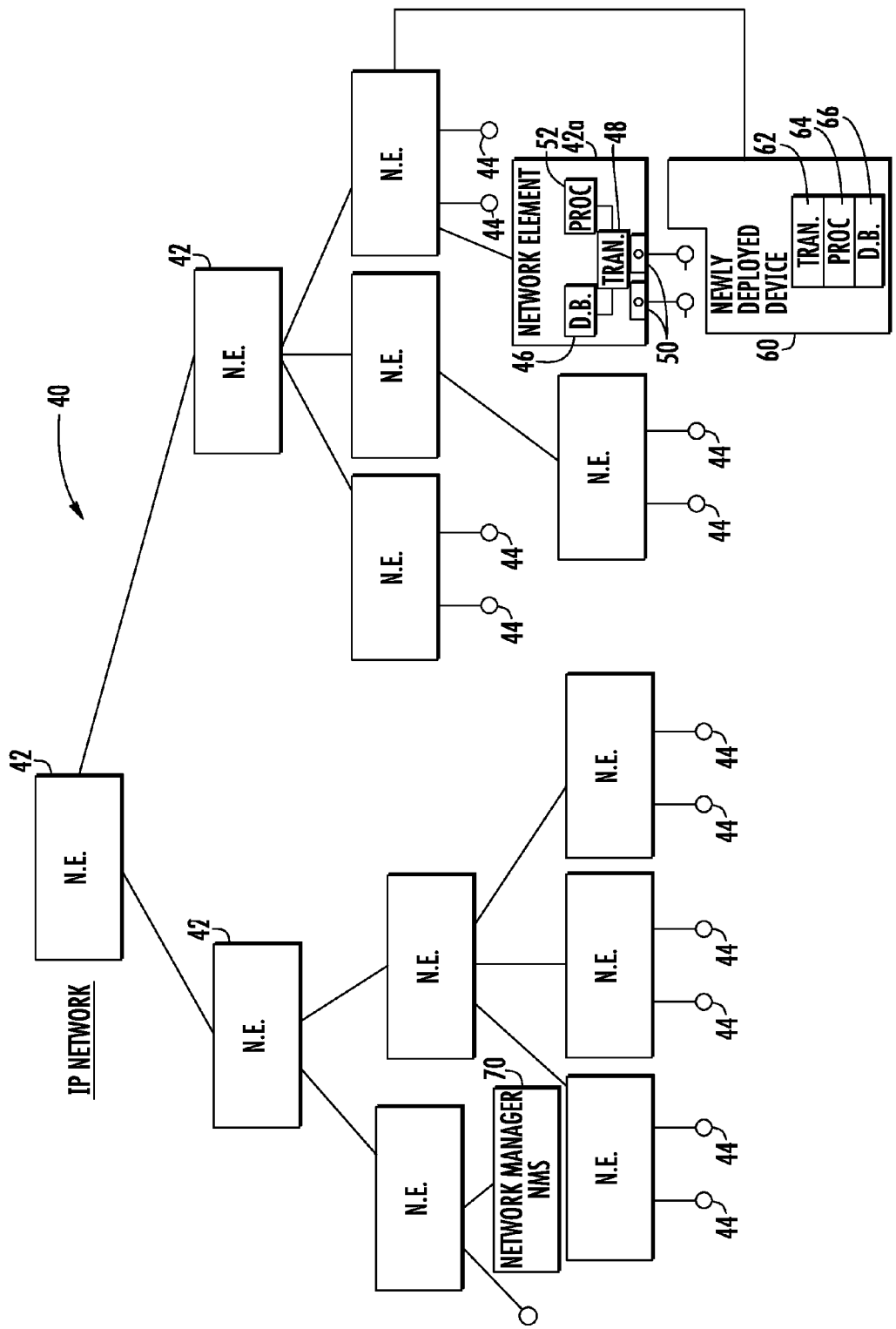
FIG. 2 is a high-level block diagram of a communications system showing a plurality of network elements, for example, network switches, forming a communications network and showing newly deployed device that is located, identified and provisioned by the network manager or similar network management system that is connected into the network in accordance with a non-limiting example.

In accordance with a non-limiting example, the system and method locates, identifies and provisions a newly deployed network device. An illustrated communications system that is a high-level diagrammatic view of a communications system 40 is shown in FIG. 2 in order to illustrate the system and method in accordance with a non-limiting example. As shown in FIG. 1, a plurality of network elements (N.E.) 42 are formed typically as network switches and/or routers and form the communications internet protocol (IP) network. The terms switches and routers are sometimes used interchangeably, but also used to describe Layer 2 and Layer 3 functionality. The switches 42 include ports with various network devices 44 connected thereto, such as IP phones, computers and other devices. One network element as a switch in this example is shown in 42a and is illustrated with components in greater detail, such as a database that includes data for a management information base (MIB) or other database 46, transceiver 48, and various ports 50 and processor 52. Other components of such network devices or switches as known to those skilled in the art are included, but not shown in detail. Each of the network elements 42 typically include such components. This communications network 40 includes the plurality of network elements as switches 42 in some examples, for example, Ethernet switches, that are connected together to form the communications network. Many of the network switches are Layer 2 network switches and each typically operates in conjunction with the database and Management Information Base (MIB) 46 such as illustrated with respect to the switch 42a. It should be understood that the term switch as described can broadly encompass different layer switches, routers and other devices, including wireless access points. Different data link protocols could be used such as Ethernet for a LAN, PPP, HDLC and ADCCP.

The newly deployed network device is shown at 60 and includes functional components such as a transceiver 62, processor 64 and database 66 and could also operate in different functional capabilities including router, switch or other device and include various ports (not shown).

In accordance with a non-limiting example, the newly deployed network device 60 propagates the discovery protocol frame to the at least one existing neighboring network device 42a and the frame includes a field having a query that solicits from the existing neighboring network device 42a the physical network connectivity data, for example, using the steps as shown and described relative to FIG. 1. The newly deployed network device 60 receives the network data address of the network manager 70 and transmits its physical network connectivity data to the remote network manager 70, which in this example, is shown remotely located on the other side of the communications network 40. It should be understood that FIG. 2 is only a high-level and fragmentary block diagram of the network. For example, the discovery frame could comprise a field having a query for inquiring within different network switches or devices that are neighboring whether the switch or device receiving the frame has a database entry regarding the Media Access Control (MAC) address and a command for transmitting back physical network connectivity data from the neighboring device to the newly deployed network device.

It should also be understood that the network 40 can be established to use link bonding, which is also referred to as Ethernet bonding, channel bonding, or network bonding in some examples. This allows two or more transmission channels, such as communication subscriber line pairs, for example, in an XDSL system to be combined at the symbol, bit, byte, frame or flow level for creating a virtual transmission channel having a higher bandwidth than a single transmission channel. The bonding across multiple communication line pairs also termed "links" provides Ethernet over Copper (EoCu) products the ability to create high bandwidth communications pipes with communication of Ethernet and similar data traffic. This bonded data link is also termed Ethernet in the First Mile (EFM) and typically treats the multiple copper lines as a unified physical layer. For example, the IEEE 802.3ah standard, the disclosure which is hereby incorporated by reference in its entirety, provides an ability to auto-detect which pairs are connected between two devices and are, therefore, eligible to be aggregated into a single Ethernet connection. Another example is the G.998.2 recommendation, for example, as applied with Single-pair High-speed Digital Subscriber Line (SHDSL) for Ethernet-based multi-pair bonding, the disclosure which is hereby incorporated by reference in its entirety.

It should be understood that the various components and network elements shown as a non-limiting example in the high-level and fragmentary diagram of FIG. 2 can include a bonding engine that receives a data string to be communicated to a customer premises (CP) and divides the data across subscriber lines from a network facility such as a central office facility to the customer premises. Similarly, a data stream to be communicated from a customer premises (CP) of the network can be received by the customer premises bonding engine, which devises data across multiple subscriber lines. The network bonding engine receives such data and reassembles the data to form the original data stream received and divided by the customer premises (CP) bonding engine.

In a network facility such as a central office, subscriber lines can be terminated by circuitry residing on a "line card"

typically as a printed circuit board as part of a rack mounted module. This can be as many as several thousand line cards at one facility. These line cards are typically held in slots of several chassis with each line card typically interfaced with the chassis backplane that enables the line card to communicate with various network devices and other equipment.

Different protocol may be used for communication between a central office and customer premises, for example, various digital subscriber line (DSL) protocols, such as asymmetric digital subscriber line (ADSL), ADSL 2, VDSL 2, high-bit rate digital subscriber line (HDSL), HDSL 2, HDSL 4, very-high-data-rate digital subscriber line (VDSL), and other protocols.

It should be understood that the communications network could include a central office that connects to a network such as a Public Switch Telephone Network (PSTN) or internet that routes data. The central office operates as a network facility and receives network data destined for equipment or other devices at customer premises. Typically, a central office in this example includes at least one telecommunications access module that includes at least one bonding engine and a transceiver and processor that could be separate or integral with a bonding engine. An access module is typically formed as a Physical Medium Entity (PME) and the bonding engine could use different configurations, including an ASIC, processor, or Field Programmable Gate Array (FPGA). A provisioning module would probably be included and a switch module switches data between access modules and a network. Typically, each data packet includes a header and data portion and control and routing information is included in the header and payload data is included in the data portion. Other examples of bonding technology are disclosed in common assigned U.S. patent application Ser. No. 12/836,695 filed Jul. 15, 2010, the disclosure which is hereby incorporated by reference in its entirety.

It should be understood that the discovery protocol frame is part of a discovery protocol that comprises a one-way neighbor discovery protocol such as the Link Layer Discovery Protocol (LLDP). At each network element 42, a database such as a Management Information Base (MIB) could be accessed such as using the Simple Network Management Protocol (SNMP). Typically in one example, the query of the discovery protocol frame is a user-defined field as a command that indicates information should be given by a network switch concerning any knowledge about stored MAC addresses. Although the description relative to FIG. 2 shows typically Ethernet switches or routers, it should be understood that the network switches can comprise at least one Local Area Network (LAN) access point in a non-limiting example. This discovery protocol frame can include an organizationally specific Type Length Value (TLV) and Organizationally Unique Identifier (OUI) and defined information string to define the query to determine the physical network connectivity data. This could include a MAC address.

There now follows a brief description of LLDP relative to the communications network shown in FIG. 2 and that can be applied for purposes of understanding.

LLDP is a common protocol used to exchange information between network devices and switches. With LLDP, each network switch has visibility of its neighboring switches. Network devices, such as Ethernet devices and switches, advertise information about themselves and store information in local Management Information Base (MIB) databases and are associated with network devices and accessible via the Simple Management Network Protocol (SMNP). This information can be used to build a network topology map using a Network Management Station (NMS), such as associated with the network manager 70 or other device as illustrated.

LLDP is a technique used for Ethernet network devices, including switches, routers and wireless LAN access points and other network devices to advertise information about themselves to other nodes on the network and store information they discover using the MIB in one non-limiting example. The details that are shared include the network device capabilities, identification (such as the MAC address), and device configuration. LLDP is typically a one-way neighbor discovery protocol with periodic transmissions. The LLDP frames are typically constrained to a single length. The frames contain formatted Type Length Values (TLV's), which carry information regarding a globally unique system and port identification, time-to-live information for aging purposes, optional system capabilities and optional system names and descriptions and management addresses such as IPV4 and IPV6.

LLDP in one aspect is covered by the IEEE standard, 802.1AB Link Layer Discovery Protocol (LLDP), the disclosure which is hereby incorporated by reference in its entirety. LLDP is advantageous over network-management tools such as reading bridge tables from an SNMP bridge MIB in which algorithms decide for the bridge tables and map the port-to-MAC address entries. For example, if a network uses the spanning tree protocol, the switch at the bottom of a configuration has ports of a single segment or network device and each port of a root switch contains the sum total of the network devices below it in its bridge table. Bridge tables are not always accurate. LLDP is also advantageous over fractal matching.

With LLDP, each network device on each port stores information defining itself and sends updates to a connected neighbor, which then stores the information in standard SNMP MIB's. Thus, information gathered with LLDP is stored in a network device and is queried with SNMP techniques. Typically, the topology of an LLDP-enabled network is discovered by "crawling" the hosts and querying a database. This is time consuming as noted above. "Crawling" can obtain information regarding a system name and description, port name and description, VLAN name, IP management address, system capabilities such as switching and routing, the MAC/PHY information and other link aggregation information.

In one aspect, LLDP defines a set of common advertisement messages and a protocol for transmitting the advertisements and a method for storing information contained in the received advertisements. Typically, LLDP-capable network devices support device chassis ID and port ID advertisements and support system name, system description and system capabilities advertisements. Typically, LLDP information is transmitted periodically and stored for a finite period. One recommended transmission rate is about 30 seconds, but this can be adjustable. Usually, the information stored in the SNMP MIB is valid for a period of time defined by the LLDP "time to live" (TTL) value as contained within a received packet. One recommendation is a TTL value of about 120 seconds, but it can be set to a maximum value of about 65,000 seconds or a minimum value of 0 seconds. Typically, a network device receives an LLDP advertisement packet and stores the information within it and initializes a timer that will be compared to the TTL value. If the timer reaches the TTL value, the network device deletes the stored information, and thus ensures that only valid LLDP information is available to the network manager as part of any Network Management Systems. It should be understood that LLDP frames typically are not forwarded, but constrained to a single link and contain formatted TLV's as type length values that carry the globally unique system and port identification, time-to-live information for aging purposes, optional system capabilities such as the router, IP phone, and wireless AP and optional system name and description, management addresses and organizational extensions.

Typically, each LLDP-enabled network device contains one or several LLDP agents such as an LLDP state machine that controls the transmission and receipt of frames and state machine control variables. The local MIB holds the locally configured data that could be supplied or modified by management applications of a management system. Remote MIB's hold and age data as received.

Usually the LLDP frame contains an LLDP multicast address that is about six bytes as a destination address and a MAC address of about six bytes and an LLDP ether type of about two bytes and the LLDPU that is data plus padding and the FCS. An LLDPU field contains the TLV's as a chassis ID, port ID, TTL and similar information. As noted before, in operation, a Link Layer Discovery Protocol (LLDP) frame is modified to allow the determination of the physical network connectivity data.

In a preferred aspect, a user-defined field is added into the LLDP frame. This user-defined field is a command that indicates that information should be given by the neighboring network device as concerning knowledge about stored MAC addresses and other information. The query is sent to at least one neighboring device and device and requests whether information is known about a particular MAC address. Information is sent back.

It should also be understood that while the newly deployed device could send a query over the LLDP as described above, in yet another embodiment, the existing neighboring device can send the required location and addressing information within the LLDP TLV's all the time without requiring the new device to send a query. Thus, the user-defined field can be defined to allow the existing device to send required location and addressing information and determine location of the newly deployed device.

Figure 3A:
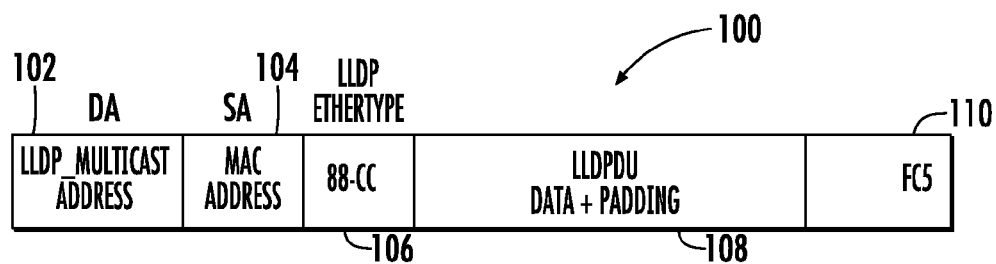
FIGS. 3A through 3C show respectively a Link Layer Discover Protocol (LLDP) frame format, an LLDPU frame format, and TLV format that can be modified and used in accordance with non-limiting examples.

FIG. 3A shows an IEEE 802.3 LLDP frame 100 that includes an LLDP multicast address 102 such as six bytes (octets) as a destination address and a MAC address 104 of about six bytes (octets) and an LLDP ethertype 106 of about two bytes (octets) and the LLDPDU 108 (Link Layer Discovery Protocol Data Unit) that is data plus padding and typically is about 1500 bytes (octets) and the FCS 110 as the frame control sequence of about four bytes (octets). The LLDPU field typically contains the TLV's as a chassis ID, port ID, TTL and similar items. In one non-limiting aspect, it is possible that the LLDP multicast address 102 equals 01-80-C2-00-00-0E that is the same as the STP except for the last octet. The information fields in each frame are contained in the LLDPU as the protocol data unit as a sequence of short, variable length, information elements known as TLV's that include the type, length and value fields and is modified for use with the system and method as described. The type identifies typically what kind of information is being sent. The length indicates the length of the information string in octets and the value is the actual information that needs to be sent.

Figure 3B:
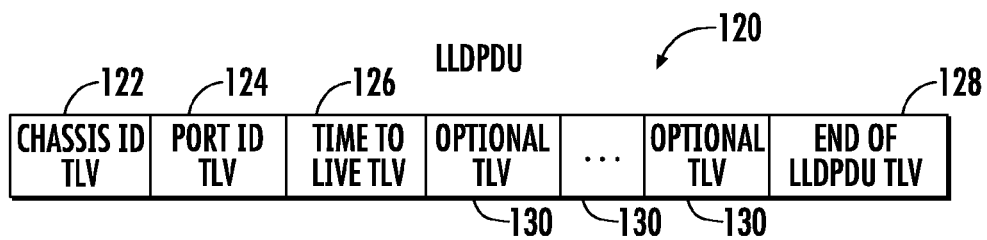

The LLDPU 120 format is shown in one non-limiting example in FIG. 3B. Mandatory TLV's that are required are illustrated. Mandatory TLV's include a chassis ID TLV 122, a port ID TLV 124, a time to live TLV 126, and an end of LLDPDU TLV 128. The optional TLV's 130 are illustrated.

Figure 3C:
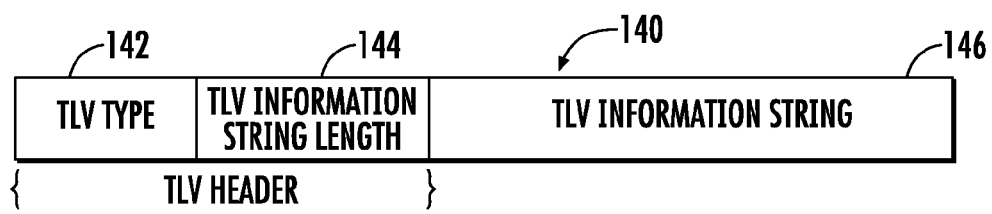

A frame for TLV format 140 is shown in FIG. 3C and shows the TLV type 142 of about seven (7) bits and the TLV information string length 144 of about nine (9) bits and the TLV information string 146 that is typically $0 \leq n \leq 511$ bytes (octets). The TLV type 142 and TLV information 144 form a TLV header 148. The chassis and port ID TLV's 122, 124 represent the connected system's chassis identification and the identification of the specific port that transmitted the LLDP frame. The receiving LLDP agent combines the chassis ID and port ID to represent an entity that sent the LLDPU. The time to live (TLV) represents for how long information contained in the received LLDPU should be valid. The end-of-LLDPU TLV marks the end of an LLDPDU. The TLV type field occupies the seven most significant bits of the first octet of the TLV format. The least significant bit in the first octet of the TLV format is the most significant bit of the TLV information string length field. Typically, the TLV type field identifies a specific TLV from the LLDP basic management set or particular set of TLV's.

Typically, an LLDP agent can advertise different TLV's. There could be a port description, system name, system description, system capabilities and management address TLV. A port description TLV identifies the port in which the LLDP agent transmitted the frame and the system name TLV represents the system's administratively assigned name. It describes a textural description of a network entity.

Figures 4A, 4B:
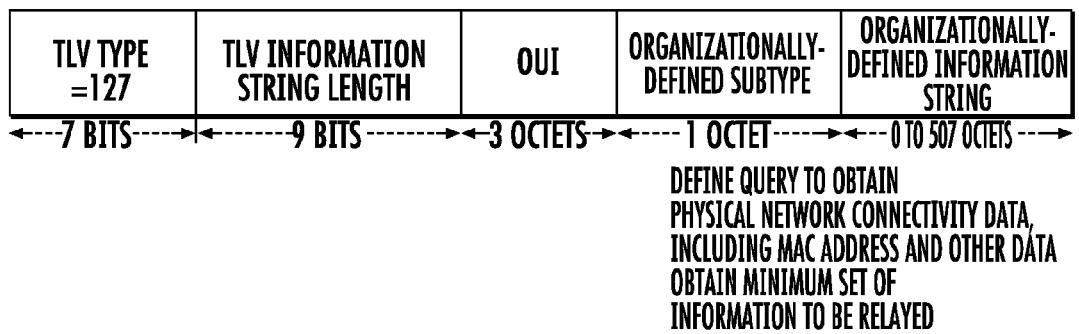
FIG. 4A is a diagram showing an example frame format for a Link Layer Discover Protocol (LLDP) organizationally specific TLV that can be modified and used in accordance with a non-limiting example.
FIG. 4B is a diagram showing an example frame format for a MAC address TLV that can be modified and used in accordance with a non-limiting example.

An example format for the modified frame is shown in FIGS. 4A and 4B. As noted before, the LLDP frame as known typically contains an LLDP multicast address, destination address, MAC address, LLDP ether type, LLDPU with data and padding and the FCS. The modified frame includes the query command in a new user defined field as a command that propagates through the network to the neighboring device as necessary to request information about its physical network connectivity and about a MAC address in one example.

There now follows greater details regarding organizationally specific TLV extensions. These extensions can be defined by different organizations or vendors and concern implemented functionality within the network forming the communications system. The TLV structure of the LLDP allows a flexible protocol and permits advanced discovery options to be created. Vendors and companies and other organizations can define TLV's that advertise information to remote entities attached to the same media that typically are a one-way advertisement and usually independent from information from a remote port. Usually, the organizationally defined extension for the TLV set includes associated LLDP MIB extensions and associated TLV selection management variables and MIB/TLV cross-reference tables. The TLV type value of 127 as shown in FIG. 4A is used for organizationally defined TLV's. IEEE 802.1 TLV extensions can have different attributes with a Virtual Local Area Network (VLAN) such as a port VLAN ID TLV, port and protocol VLAN ID TLV, VLAN name TLV, and protocol identity TLV. The prot VLAN ID TLV allows a bridge port to advertise the port's VLAN identifier (PVID) that is associated with untagged or priority tagged frames. The port and protocol VLAN ID TLV allows a bridge to advertise whether it supports protocol VLAN's and what the protocols are associated. The VLAN name TLV allows a bridge to advertise the textural name of any VLAN with which it is configured. The protocol identity TLV allows a bridge to advertise particular protocols accessible through its port.

An 802.3 LAN interface can have TLV extensions such as the MAC/PHY configuration/status TLV and power via MDI TLV and length aggregation TLV and maximum frame size TLV. The MAC/PHY configuration/status TLV advertises a bit-rate and duplex capability of a node and current duplex and bit-rating of a sending node. It can advertise whether the settings were the result of auto-negotiation during link initiation or manual override. The power via MDI TLV advertises power-via-MDI capabilities. The length-aggregation TLV advertises whether the link is capable of being aggregated and whether it is currently in an aggregation, and if it is, the port of the aggregation. The maximum frame size TLV advertises the maximum supported 802.3 frame size of a sending port or station.

In accordance with a non-limiting example, an organizationally-specific TLV is used, filling in the OUI (0x00 0xA0 0xCA) then populating the defined information string with the MAC address and action. An example is a frame that is sent from one network device and meant to be propagated to other devices via LLDP. The "action" may be for the receiving device or switch to obtain relevant data. The action could also be to reply to the originating network switch with information about the MAC address, i.e., what port it is connected to.

FIG. 4A shows there is an LLDP organizationally-specific TLV that is defined so that an organization can extend the LLDP to fit their needs. The OUT (organizationally unique identifier) is included so that each organization can differentiate between their own special TLV's and the organization's TLV's. This special TLV is used to define the MAC address of the faulty device.

As shown in FIG. 4A, the TLV type equals 127 and is about seven bits in this example. The TLV information string length is about nine bits. The OUI is about three octets and the organizationally-defined subtype is about one octet. The organizationally-defined information string is about zero to about 507 octets. FIG. 4B shows a frame example for the MAC address TLV relative to the LLDP organizationally-specific TLV. The last grouping shows the action and can include additional information.

Figure 5:
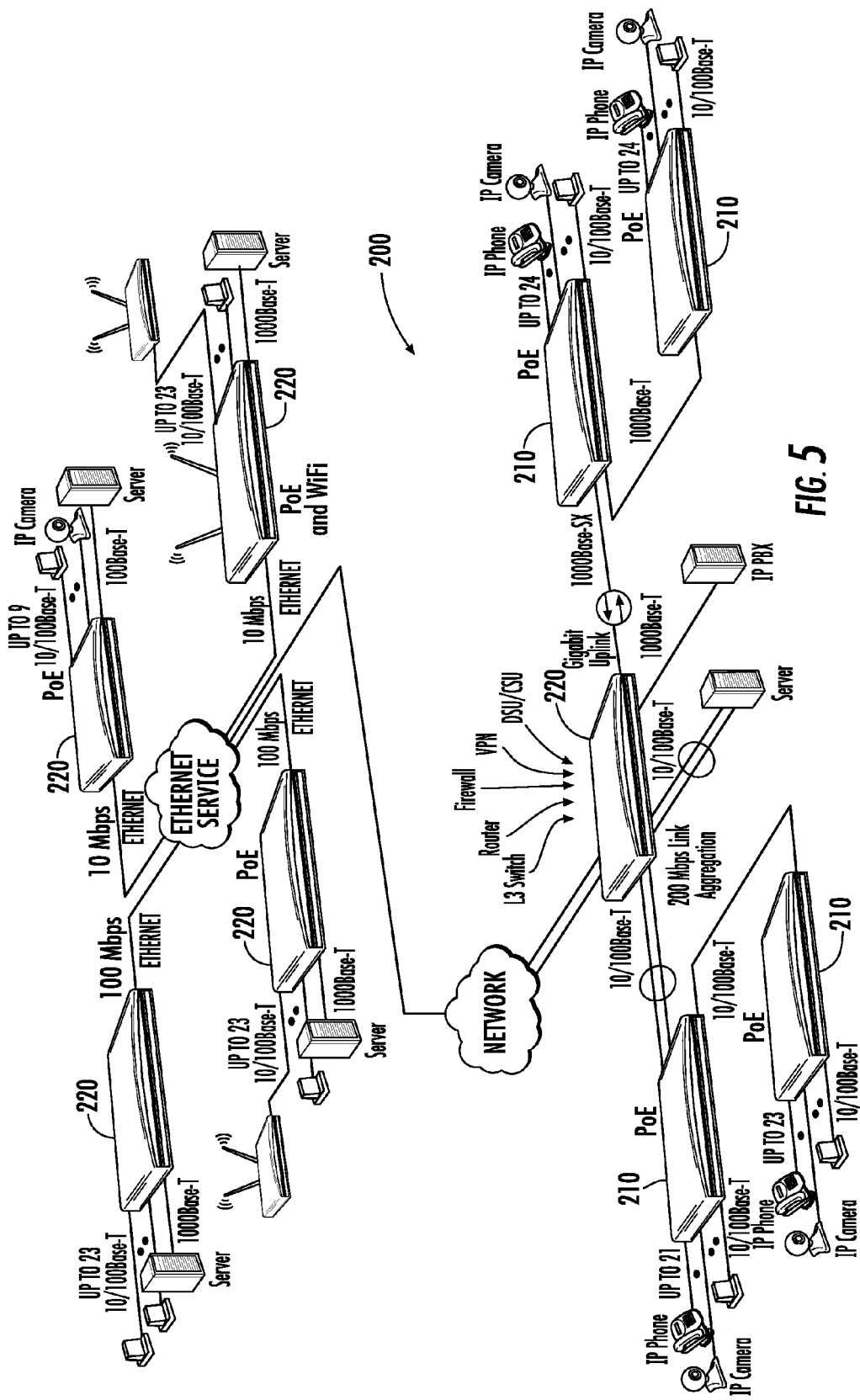
FIG. 5 is an example of a communications system that could incorporate the method as described and showing various components and the methodology and uses the modified frame formats as shown in FIGS. 3A-3C and 4A and 4B in accordance with a non-limiting example for locating an offending network device and maintaining network integrity.

There now follows a general description of a larger IP network as a general description to show a more specific and larger network example to which the examples as described can be applied. FIG. 5 is a system diagram of a communications system 200 that includes various network components and devices as shown in FIG. 2 and other interconnected platforms, switches and platforms or servers. It should be understood that the system 200 shown in FIG. 5 is only one non-limiting example of a communications system that can be used with the methodology as described.

FIG. 5 shows the communications system that includes layer 2 and layer 3 network switching functionality. Typically, layer 2 switches can be provided such as the NetVanta 1200 and 1500 series switches 210 while layer 3 Ethernet switches can be provided, such as NetVanta 1300 series devices 220 as non-limiting examples, for example, the NetVanta 1335 and related series of devices. In FIG. 5, various devices such as a 1300 series devices by ADTRAN, INC. are illustrated and 1200 series devices by ADTRAN, INC. as layer 2 devices all show layer 2 and layer 3 switching and functionality in this non-limiting example. It should be understood that a Total Access multi-service access and aggregation platform (MSAP), e.g., Total Access 5000 from ADTRAN, INC. can be used in these examples with network modifications.

Switches and other network devices as illustrated in this example run the ADTRAN Operating System (AOS) and provide standards-based, non-blocking switching and support for virtual LAN's (VLAN's), Quality of Service (QOS), and Class of Service (COS) for applications such as VoIP, link aggregation, advanced management and remote configuration capability and other functions. The devices in some aspects are fully managed layer 2 and layer 3 fast Ethernet switches and include 802.3af Power over Ethernet (PoE) enabled capabilities in some examples. The quality of service capabilities support mission critical applications such as VoIP. A WiFi access controller manages a plurality of Wireless Access Points (WAP's) in another example. These Ethernet switches can support layer 2, 802.1p Class of Service (COS) and weighted round robin and strict priority queuing for traffic prioritization. At layer 3, a multi-service router supports various markings and class-based weighted fair or low latency queuing.

As noted before, layer 2 switches can be stackable PoE switches with gigabit uplinks. In one non-limiting example, a Wireless Access Point (WAP) uses a NetVanta 150 wireless access point (WAP) or NetVanta 1335 with WiFi that provides 802.11 a/b/g radio support and Virtual Access Points (VAP's) and segment wireless networks together. All-in-one switch-routers perform services such as switching, IP routing, firewall, Virtual Private Networking (VPN), and 802.11a/b/g WiFi in a single platform. A NetVanta 1335 series switch integrates a modular IP access router and 24-port PoE layer 3 switch, firewall, VP and appliance and wireless access in a platform. Layer 2 switch-routers can be all-in-one access platforms such as the NetVanta 1200 series switch-routers for a cost-effective, single box approach to Voice over IP (VoIP) migration. Layer 3 switching is provided in one example for VLAN trunking and VGRP for 802.1Q VLAN functionality and provide separation of broadcast domains and functional work areas.

Other communications servers could be used in the illustrated networks of FIG. 5 such as a NetVanta 7000 series servers and devices (including NetVanta 7100 devices) as manufactured by ADTRAN, INC. of Huntsville, Ala. The communication servers are an all-in-one, office-in-a-box that provides voice and data solutions, including Private Branch Exchange (PBX) functionality. SIP communications are used to various remote sites having communications servers such as IP business gateways in other examples.

Any communications servers could be formed as a single chassis and provide a LAN-to-WAN infrastructure and Quality of Service (QoS) that maintains voice quality and includes a Graphical User Interface (GUI) for network set-up and facilitate installation and system administration. In this example, a communications server allows a converged IP voice and data network with a full-function IP PBX for voice such as a NetVanta 7000 series. It includes an integrated Power Over Ethernet (POE) switch-router for data in an integrated device and a Virtual Private Network (VPN) for secure Internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules include T1 and ADSL Network Interface Modules (NIMs). Analog (FXS, FXO) Voice Interface Modules (VIMs) are included in another example with T1, PRI voice interface modules and fiber SFP modules.

A communications server, in one example, is an integrated communications platform and includes capability of a fast Ethernet switch with Gigabit uplinks and expansion slots for the network interface modules and voice interface modules. A IP telephone system as part of the communications network 200 as illustrated could include voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. Some devices can operate as an integral SIP gateway with the appropriate FXS and FXO analog interfaces to support analog phones, fax machines, modems and credit card readers. An integrated voice mail can include 3,000 or more messages on eight ports and multi-level auto-attendant that are multi-level on eight ports such as in the example of a NetVanta 7000 series device. These devices include, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

In one example, SIP networking is supported between multiple locations. A business can connect multiple sites and have three or four digit dialing and local call routing and survivability and on-net calls for toll bypass. Multiple SIP trunks allow a communications server to connect to other communication servers. Remote SIP trunks can be supported and connect to all endpoints at all locations such that a user can have local voice mail and auto-attendant services. A hub and spoke SIP network can be accomplished in another example. A dedicated communications server can aggregate SIP trunks at a central location, which for qualified applications, increases the number of other communication servers that can be networked together.

The user can use an Internet Protocol (IP) phone such as an IP 700 series of telephones with different line versions and support multiple call functions. It is possible to incorporate voice mail-to-email applications and personal auto-attendant in which each phone sets up their own automatic attendant. It is also possible for the communications server to ring a series of stations and one external phone number. A communications server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for a platform or communications server to work in a multi-vendor environment and with an integrated T1-PRI trunk to consolidate separate voice lines and internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
a plurality of network switches interconnected together and configured to form a communications network;
one of the network switches having a newly deployed network device;
at least one existing neighboring network device connected to the newly deployed network device;
a Network Manager connected to the communications network remotely from the newly deployed network device and existing neighboring network device;
wherein the newly deployed network device is configured to determine its physical network connectivity within the communications network by propagating a discovery protocol frame to the at least one existing neighboring network device, said discovery protocol frame having an organizationally specific Type Length Value (TLV) and Organizationally Unique Identifier (OUI) and data defining a query as a command to request data of physical network connectivity and solicit from the existing neighboring network device the physical network connectivity data of the newly deployed device within the communications network, said newly deployed network device also configured to receive in response to the query, its physical network connectivity data and the network data address on the Network Manager, and in response, transmit its physical network connectivity data to the remote Network Manager; and
wherein said Network Manager is configured to transmit provisioning data to the newly deployed network device based on the received physical network connectivity data.

2. The communications system according to claim 1, wherein the physical network connectivity data received from the at least one existing neighboring network device comprises at least one network data address for the Network Manager.

3. The communications system according to claim 2, wherein said newly deployed network device is configured to receive a plurality of potential network data addresses for the Network Manager and attempt connection to the Network Manager using at least one of the plurality of potential network data addresses.

4. The communications system according to claim 2, wherein in the event the newly deployed network device does not receive a network data address for the Network Manager, the newly deployed device is configured to announce itself by transmitting Layer 2 broadcast messages throughout the communications network.

5. The communications system according to claim 1, wherein the discovery protocol frame comprises a Link Layer Discovery Protocol (LLDP) frame.

6. The communications system according to claim 1, wherein the discovery protocol frame comprises a Link Layer Ethernet OAM message.

7. The communications system according to claim 1, wherein the physical network connectivity data comprises at least one of physical and logical location connection data for the newly deployed network device and data uniquely identifying the existing connected device.

8. The communications system according to claim 7, wherein the at least one of physical and logical location connection data comprises data regarding the physical slot and port of the existing neighboring network device.

9. The communications system according to claim 7, wherein the at least one of physical and logical location connection data comprises data regarding the ID of a logical Ethernet in the First Mile (EFM) bonding group.

10. The communications system according to claim 1, wherein physical network connectivity data comprises device data that identifies the existing network device.

11. The communications system according to claim 10, wherein the device data comprises at least one of an IP address and node number of the existing neighboring network device to the newly deployed network device.

12. The communications system according to claim 1, and further comprising a Management Information Base (MIB)

that is configured to be accessed via the Simple Network Management Protocol (SNMP) to determine the physical network connectivity data.

13. A communications method, comprising:
discovering the physical network connectivity of a newly deployed network device within the communications network by propagating a discovery protocol frame to at least one existing neighboring network device, said discovery protocol frame having an organizationally specific Type Length Value (TLV) and Organizationally Unique Identifier (OUI) and data defining a query as a command to request data of physical network connectivity and solicit from the existing neighboring network device the physical network connectivity data of the newly deployed device within the communications network;
in response to the query, receiving at the newly deployed network device and from the at least one existing neighboring network device the physical network connectivity data of the newly deployed network device;
receiving at the newly deployed device the network data address on the Network Manager;
transmitting from the newly deployed network device its physical network connectivity data to the remote Network Manager; and
transmitting provisioning data from the Network Manager to the newly deployed network device based on the received physical network connectivity data.

14. The method according to claim 13, wherein the physical network connectivity data received from the at least one neighboring network device comprises at least one network data address for the Network Manager.

15. The method according to claim 14, and further comprising receiving a plurality of potential network data addresses for the Network Manager wherein the newly deployed device attempts connection to the Network Manager using at least one of the plurality of potential data addresses.

16. The method according to claim 13, wherein in the event the newly deployed network device does not receive a network data address for the Network Manager, the newly deployed device announces itself by transmitting Layer 2 broadcast messages throughout the communications network.

17. The method according to claim 13, wherein the discovery protocol frame comprises a Link Layer Discovery Protocol (LLDP) frame.

18. The method according to claim 13, wherein the discovery protocol frame comprises a Link Layer Ethernet OAM message for discovering the physical network connectivity of the newly deployed network device.

19. The method according to claim 13, wherein the physical network connectivity data comprises at least one of physical and logical location connection data of the newly deployed network device and data uniquely identifying the existing connected device.

20. The method according to claim 19, wherein the at least one of physical and logical location connection data comprises data regarding the physical slot and port of the existing neighboring network device.

21. The method according to claim 19, wherein the at least one of physical and logical location connection data comprises data regarding the ID of a logical EFM bonding group.

22. The method according to claim 13, wherein physical network connectivity data comprises device data that identifies the existing network device.

23. The method according to claim 22, wherein the device data comprises the IP address or node number of the existing neighboring network device to the newly deployed network device.

24. The method according to claim 13, and further comprising accessing at a network switch a Management Information Base (MIB) via the Simple Network Management Protocol (SNMP) to determine the physical network connectivity data.

25. A communications system, comprising:
a plurality of network switches interconnected together and configured to form a communications network;
one of the network switches having a newly deployed network device;
at least one existing neighboring network device connected to the newly deployed network device;
a Network Manager connected to the communications network remotely from the newly deployed network device and existing neighboring network device;
wherein the newly deployed network device is configured to determine its physical network connectivity within the communications network by propagating a discovery protocol frame to the at least one existing neighboring network device, said discovery protocol frame having an organizationally specific Type Length Value (TLV) and Organizationally Unique Identifier (OUI) and data defining a query as a command to request data of physical network connectivity and solicit the physical network connectivity data of the newly deployed device within the communications network, wherein the network connectivity data is transmitted to the Network Manager; and
wherein said Network Manager is configured to transmit provisioning data to the newly deployed network device based on the received physical network connectivity data.

* * * * *

UNITED STATES PATENT AND TRADEMARK OFFICE
CERTIFICATE OF CORRECTION

PATENT NO.        : 8,443,065 B1                                    Page 1 of 1
APPLICATION NO.   : 12/941123
DATED             : May 14, 2013
INVENTOR(S)       : Troy White It is certified that error appears in the above-identified patent and that said Letters Patent is hereby corrected as shown below:

Title Page, Item (73) (Assignee), line 1, delete "Huntville, AL" and insert -- Huntsville, AL --, therefor.

Signed and Sealed this
First Day of April, 2014

Michelle K. Lee
*Deputy Director of the United States Patent and Trademark Office*